United States Patent
Lee

(10) Patent No.: US 11,820,345 B2
(45) Date of Patent: Nov. 21, 2023

(54) APPARATUS AND METHOD FOR DETERMINING WHEEL CONDITION

(71) Applicant: HYUNDAI MOBIS CO., LTD., Seoul (KR)

(72) Inventor: Ju Ho Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 364 days.

(21) Appl. No.: 17/179,373

(22) Filed: Feb. 18, 2021

(65) Prior Publication Data
US 2021/0284121 A1    Sep. 16, 2021

(30) Foreign Application Priority Data
Mar. 10, 2020 (KR) .................. 10-2020-0029581

(51) Int. Cl.
*B60T 17/22* (2006.01)
*B60K 35/00* (2006.01)
(Continued)

(52) U.S. Cl.
CPC ............ *B60T 17/221* (2013.01); *B60K 35/00* (2013.01); *B60T 8/17616* (2013.01); *B60T 8/96* (2013.01); *G01B 21/22* (2013.01); *G01L 17/00* (2013.01); *G01P 3/00* (2013.01); *G01P 15/08* (2013.01); *B60K 2370/11* (2019.05); *B60K 2370/167* (2019.05); *B60T 2240/00* (2013.01); *B60T 2240/03* (2013.01); *B60T 2250/00* (2013.01); *B60T 2270/413* (2013.01); *B60T 2270/416* (2013.01)

(58) Field of Classification Search
CPC ...... B60T 17/221; B60T 8/17616; B60T 8/96; B60T 2240/00; B60T 2240/03; B60T 2250/00; B60T 2270/413; B60T 2270/416; B60T 8/885; B60T 17/22; B60T 8/171; B60T 8/1725; B60K 35/00; B60K 2370/11; B60K 2370/167; B60K 2370/152; G01B 21/22; G01L 17/00; G01P 3/00; G01P 15/08; G01P 3/48; B60C 23/045; B60C 23/0489; B60C 23/04; B60C 23/042; B60C 23/0455; B60C 23/0486; B60W 40/12; B60W 10/06; B60W 10/184; B60W 40/105; B60W 50/14; B60W 2050/0215; B60W 2050/146; B60W 2422/70; B60W 2520/10; B60W 2520/28; B60Y 2400/304
See application file for complete search history.

(56) References Cited

U.S. PATENT DOCUMENTS

2019/0054909 A1* 2/2019 Shah ................. B60T 7/22

FOREIGN PATENT DOCUMENTS

KR        20090034519         4/2009

* cited by examiner

*Primary Examiner* — Yuen Wong
(74) *Attorney, Agent, or Firm* — H.C. Park & Associates, PLC

(57) ABSTRACT

An apparatus for determining a wheel condition on whether wheel locking occurs in each wheel of a vehicle having a main brake apparatus and an auxiliary brake apparatus. The apparatus includes: a WSS (Wheel Speed Sensor) configured to primarily detect whether wheel locking occurs; a TPMS (Tire Pressure Monitoring System) configured to secondarily detect whether wheel locking occurs; and a control unit configured to determine, when the WSS fails, a wheel condition indicative of whether wheel locking occurs in each wheel, by using information detected through the TPMS.

13 Claims, 4 Drawing Sheets

(51) Int. Cl.
*B60T 8/96* (2006.01)
*G01L 17/00* (2006.01)
*G01P 15/08* (2006.01)
*G01B 21/22* (2006.01)
*G01P 3/00* (2006.01)
*B60T 8/1761* (2006.01)

APPARATUS AND METHOD FOR DETERMINING WHEEL CONDITION

CROSS-REFERENCE TO RELATED APPLICATION

This application claims priority from and the benefit of Korean Patent Application No. 10-2020-0029581, filed on Mar. 10, 2020, which is hereby incorporated by reference for all purposes as if set forth herein.

BACKGROUND

Field

Exemplary embodiments relate to an apparatus and method for determining a wheel condition, and more particularly, to an apparatus and method for determining a wheel condition, which can determine a wheel condition by using two types of sensors, such that when one sensor fails, the other sensor may be used to determine the wheel condition, thereby improving the braking stability of a vehicle.

Discussion of the Background

Generally, in order to perform braking, an electronic brake apparatus (for example, ABS/ESC) measures the rotation speed of each wheel and prevents wheel locking from occurring, thereby reducing a braking distance.

For this operation, the electronic brake apparatus includes a WSS (Wheel Speed Sensor) which is mounted on each wheel, and measures the rotation speed of the wheel and then transfers a signal to an ECU (Electronic Control Unit), thereby deciding whether to intervene the electronic brake apparatus.

However, with the recent increase in demand for autonomous vehicles, the necessity for providing primary and secondary brake apparatuses and various sensors is increasing for a stable operation of the electronic brake apparatus. The provision of the primary and the secondary sensors may be implemented by simply mounting the same types of sensors on the vehicle. However, when the same types of sensors are mounted, the same types of errors may occur at the same time for those sensors.

Thus, research has been recently conducted on dualization of WSSs. Currently, however, it is difficult to achieve a desired level of effect.

The above information disclosed in this Background section is only for enhancement of understanding of the background of the invention and, therefore, it may contain information that does not constitute prior art.

SUMMARY

Exemplary embodiments of the present invention provide an apparatus and method for determining a wheel condition, which can doubly determine a wheel condition by using two types of sensors, thereby improving the braking stability of a vehicle.

In an embodiment, there is provided an apparatus for determining a wheel condition on whether wheel locking occurs in each wheel of a vehicle. The apparatus may include: a WSS (Wheel Speed Sensor) configured to primarily detect whether wheel locking occurs; a TPMS (Tire Pressure Monitoring System) configured to secondarily detect whether wheel locking occurs; and a control unit configured to determine, when the WSS fails, a wheel condition indicating whether wheel locking occurs in each wheel, by using information detected through the TPMS.

The control unit may determine the wheel condition on whether wheel locking occurs in each wheel, by using acceleration information detected through the TPMS or an acceleration sensor.

The apparatus may further include a TPMS detection unit configured to detect the strength of a sensing value signal when receiving the signal from the TPMS, wherein the control unit calculates and learns a distance from the TPMS detection unit to the TPMS, a rotation angle and rotation speed of the corresponding wheel, and the location of the TPMS within the wheel, and determines the wheel condition for each traveling speed of the vehicle, based on the calculated and learned information, whenever the vehicle is operated.

The sensing value transferred by the TPMS may include change periods of an acceleration value and a pressure value.

The strength of the signal transmitted by the TPMS may be increased as the distance between the TPMS and the TPMS detection unit decreases while the corresponding wheel is rotated, and decreased as the distance between the TPMS and the TPMS detection unit increases while the wheel is rotated.

The TPMS detection unit may transmit the strength of the signal and the information, transmitted by the TPMS, to the control unit through a communication unit.

The control unit may calculate the distance from the TPMS detection unit to the TPMS based on the strength of the signal.

The control unit may calculate the rotation angle and rotation speed of the corresponding wheel based on the change periods of the pressure value and the acceleration value, detected by the TPMS.

The control unit may calculate the location of the TPMS within the corresponding wheel, based on the distance from the TPMS detection unit to the TPMS and the rotation angle and rotation speed of the wheel.

The control unit may output the calculated information and the condition information of the corresponding wheel to a display device installed in a designated output unit through the communication unit, by using a GUI (Graphic User Interface) method.

The control unit may control at least one of a main brake apparatus and an auxiliary brake apparatus by using the wheel condition which is determined based on the distance from the TPMS detection unit to the TPMS, the rotation angle and rotation speed of the corresponding wheel, and the location of the TPMS within the wheel.

In an embodiment, a method for determining a wheel condition may include: detecting, by a control unit, a start-up of a vehicle, receiving an acceleration value for each wheel from a TPMS corresponding to the wheel when the start-up of the vehicle is detected, and detecting the strength of a signal transmitted by the TPMS, the signal including designated information; calculating, by the control unit, a distance from a TPMS detection unit corresponding to the wheel to the TPMS based on the strength of the signal; calculating, by the control unit, a location of the TPMS within the wheel by matching an acceleration value with the distance from the TPMS detection unit to the TPMS; learning, by the control unit as learned information, the acceleration value and the distance from the TPMS detection unit to the TPMS, according to the traveling speed of the vehicle; and determining, by the control unit based on the learned information, the wheel condition according to the acceleration value for each traveling speed and the distance from the TPMS detection unit to the TPMS.

The strength of the signal may be increased as the distance between the TPMS and the TPMS detection unit decreases while the corresponding wheel is rotated, and decreased as the distance between the TPMS and the TPMS detection unit increases while the wheel is rotated.

In the receiving of the acceleration value for each wheel from the TPMS, the TPMS detection unit may transmit the strength of the signal and information, transmitted by the TPMS, to the control unit through a communication unit.

In the receiving of the acceleration value for each wheel from the TPMS, the control unit may additionally calculate the rotation angle and rotation speed of the corresponding wheel based on the change periods of the pressure value and the acceleration value, detected by the TPMS.

The method may further include outputting, by the control unit, the calculated information and the condition information of the corresponding wheel to a display device installed in a designated output unit through the communication unit, by using a GUI, after the calculating of the location of the TPMS within the corresponding wheel.

The method may further include controlling by the control unit, at least one of a main brake apparatus and an auxiliary brake apparatus by using the determined wheel condition, after the determining of the wheel condition.

In accordance with the embodiments described herein, the apparatus and method for determining a wheel condition can determine a wheel condition by using two types of sensors, in which one sensor may operate as a backup for determining the wheel condition when the other sensor fails, thereby improving the braking stability of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
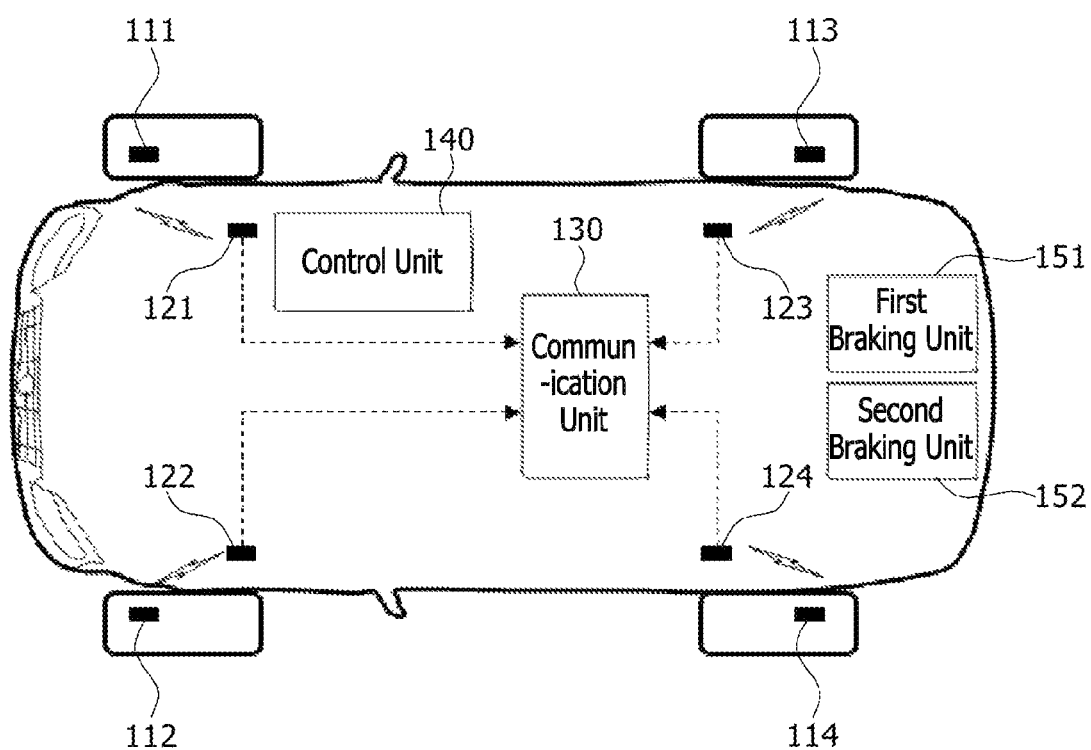
FIG. 1 is a diagram illustrating a schematic configuration of an apparatus for determining a wheel condition in accordance with an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for determining a wheel condition will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a diagram illustrating a schematic configuration of an apparatus for determining a wheel condition in accordance with an embodiment.

As illustrated in FIG. 1, the apparatus for determining a wheel condition in accordance with an embodiment includes TPMSs (Tire Pressure Monitoring Systems) 111 to 114, TPMS detection units 121 to 124, a communication unit 130, a control unit 140 and braking units 151 and 152.

The TPMSs 111 to 114 are installed on the respective wheels of a vehicle, and transfer sensing values to the TPMS detection units 121 to 124 wirelessly.

For example, each of the sensing values transferred by the TPMSs 111 to 114 includes an acceleration value and a pressure value. At this time, each of the TPMSs may include a separate acceleration sensor (for example, an IMU (Inertia Measurement Unit)) for detecting acceleration information.

For example, a rotation value output is decided by a trigonometric function of longitudinal acceleration gX_veh and horizontal acceleration gY_ang based on an angle at which the acceleration sensor is positioned. When the vehicle is actually accelerated, the longitudinal acceleration gX_veh is increased. Thus, when determining the rotation value output, the apparatus needs to subtract the longitudinal acceleration value from an airbag IMU in order to determine whether wheel locking occurred. This is expressed as gX_actual=gX_ang−gX_veh. Here, gX_actual represents an actual output value of the acceleration sensor for each location, gX_ang represents a rotation value outputted from the corresponding TPMS, and gX_veh represents an actual longitudinal acceleration value of the vehicle, extracted from various IMUS or logics within the vehicle.

Figure 3:
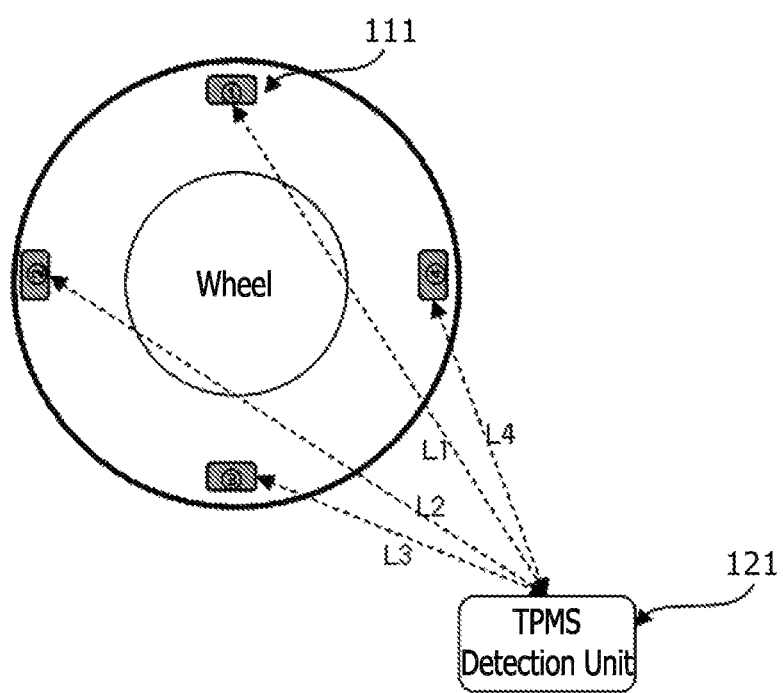
FIG. 3 is a diagram for describing a method for detecting a distance to a TPMS detection unit by using the strength of a signal detected through the TPMS in FIG. 1.

When receiving the sensing value signals from the TPMSs 111 to 114, the TPMS detection units 121 to 124 detect the strengths (for example, RSS (Received Signal Strength) of the signals (see FIG. 3).

For example, as illustrated in FIG. 3, the strength (for example, RSS) of the signal transmitted by each of the TPMSs 111 to 114 is increased as the distance between the TPMS and the corresponding TPMS detection unit decreases while the corresponding wheel (or tire) is rotated, and decreased as the distance between the TPMS and the corresponding TPMS detection unit increases while the corresponding wheel (or tire) is rotated. When the strengths (for example, RSS) of the signals transmitted by the TPMSs 111 to 114 are used, the rotation direction may not be recognized. In the present embodiment, however, the rotation direction may be determined according to the acceleration values (or the change periods of the acceleration values) detected by the TPMSs 111 to 114.

The TPMS detection units 121 to 124 transmit the strengths of the signals and information, which are transmitted by the TPMSs 111 to 114, to the control unit 140 though the communication unit 130, the information including a pressure value, an acceleration value and the change periods of the pressure value and the acceleration value.

The TPMS detection units 121 to 124 are mounted at designated locations (for example, edges of the wheels outside the vehicle) outside the vehicle, respectively. Thus, the strengths (for example, periodic change in RSS) of detected signals may differ depending on the distances which are changed by the rotations of the wheels.

The control unit 140 calculates the distances from the TPMS detection units 121 to 124 to the TPMSs 111 to 114 based on the strengths of the signals.

The control unit 140 calculates the rotation angles and rotation speeds of the wheels based on the information (for example, the pressure value, the acceleration value, and the change periods of the pressure value and the acceleration value).

Thus, the control unit 140 may calculate the distances from the TPMS detection units 121 to 124 to the TPMSs 111 to 114, the rotation angles and the rotation speeds, and recognize the locations of the TPMSs 111 to 114 within the respective wheels based on the distances, the rotation angles and the rotation speeds.

The control unit 140 may calculate the distances from the TPMS detection units 121 to 124 to the TPMSs 111 to 114, the rotation angles and the rotation speeds, and learn the locations of the TPMSs 111 to 114 within the respective wheels based on the distances, the rotation angles and the rotation speeds, whenever the vehicle travels. Therefore, the control unit 140 may calculate the distances to the TPMSs 111 to 114, the rotation angles, the rotation speeds and the locations of the TPMSs 111 to 114 within the respective wheels for each vehicle speed. That is, the control unit 140 may determine the conditions of the wheels.

The control unit 140 may output the calculated information (for example, the distances, the rotation angles, the rotation speeds and the locations of the TPMSs within the respective wheels) to a designated output unit (for example, an AVN device of the vehicle or a display device installed in a cluster of the vehicle) (not illustrated) through the communication unit 130 by using a GUI (Graphic User Interface) method.

Furthermore, the control unit 140 may control the braking units 151 and 152 at the same time, based on the calculated information (for example, the distances, the rotation angles, the rotation speeds and the locations of the TPMSs within the respective wheels). Alternatively, the control unit 140 may control a first brake apparatus (for example, a main brake apparatus) 151 by using the condition information of the wheels, detected through the WSSs (not illustrated), and control a second brake apparatus (for example, an auxiliary brake apparatus) 152 by using the condition information of the wheels, detected through the TPMSs.

Furthermore, the control unit 140 detects the conditions of the wheels (for example, the rotations of the wheels and information on whether wheel locking occurs) by using the acceleration values of the TPMSs 111 to 114.

Figure 2:
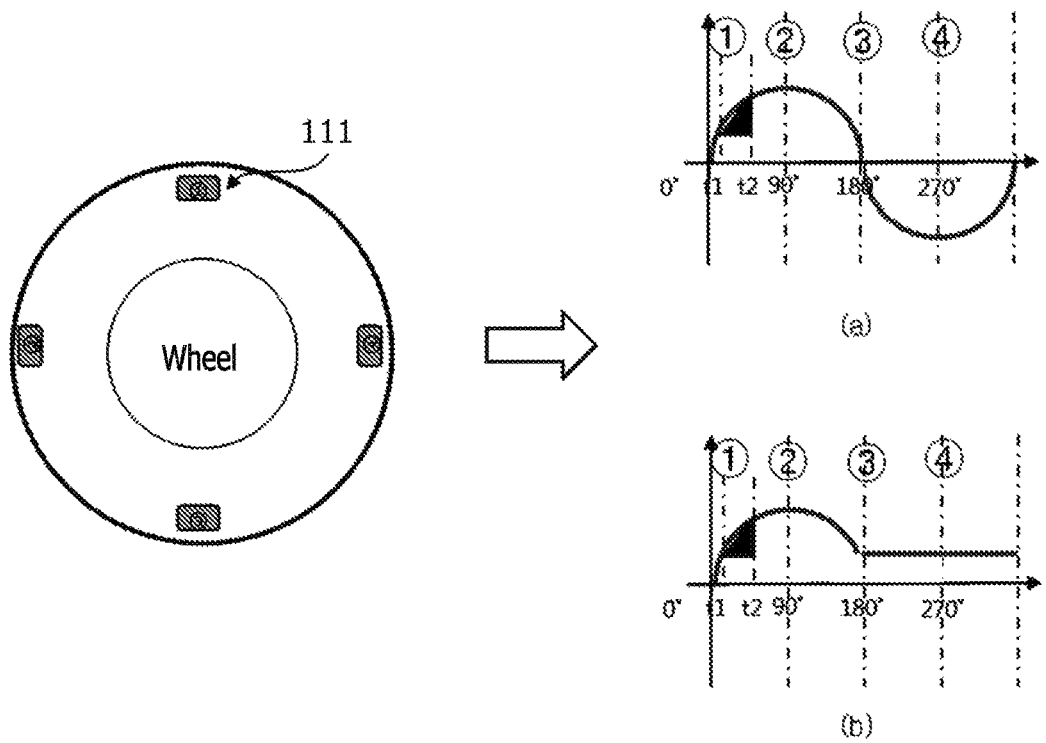
FIG. 2 is a diagram for describing a method for detecting a rotation speed and rotation direction by using an acceleration value detected through a TPMS (Tire Pressure Monitoring System) in FIG. 1.

For example, as illustrated in FIG. 2, the acceleration value of the TPMS generates a sine-wave signal (see waveform a in FIG. 2) when the corresponding wheel is rotated, and generates a linear signal (see waveform b in FIG. 2) when the corresponding wheel is not rotated.

Referring to waveform a) in FIG. 2, the control unit 140 may determine the rotation of each of the wheels by using the output of the acceleration value. Due to the characteristic of the acceleration value, however, the same values may be generated per rotation of the wheel, and distinguished from each other according to a difference between values which are measured with a time difference set therebetween. For example, the same values may be generated at 45 degrees and 135 degrees. However, when t2−t1 is a positive number, the measured value corresponds to 45 degrees, and when t2−t1 is a negative number, the measured value corresponds to 135 degrees. When wheel locking occurs (sections ③ and ④ of waveform b in FIG. 2), the wheel locking may be detected only through the acceleration value. However, the control unit 140 may misrecognize that wheel locking has occurred depending on the surrounding situations during actual driving on the road, even though wheel locking did not occur. Therefore, in accordance with the present embodiment, the control unit 140 determines the final conditions (for example, wheel locking) of the wheels by additionally using the respective pieces of distance information from the TPMS detection units 121 to 124 to the TPMSs 111 to 114.

Figure 4:
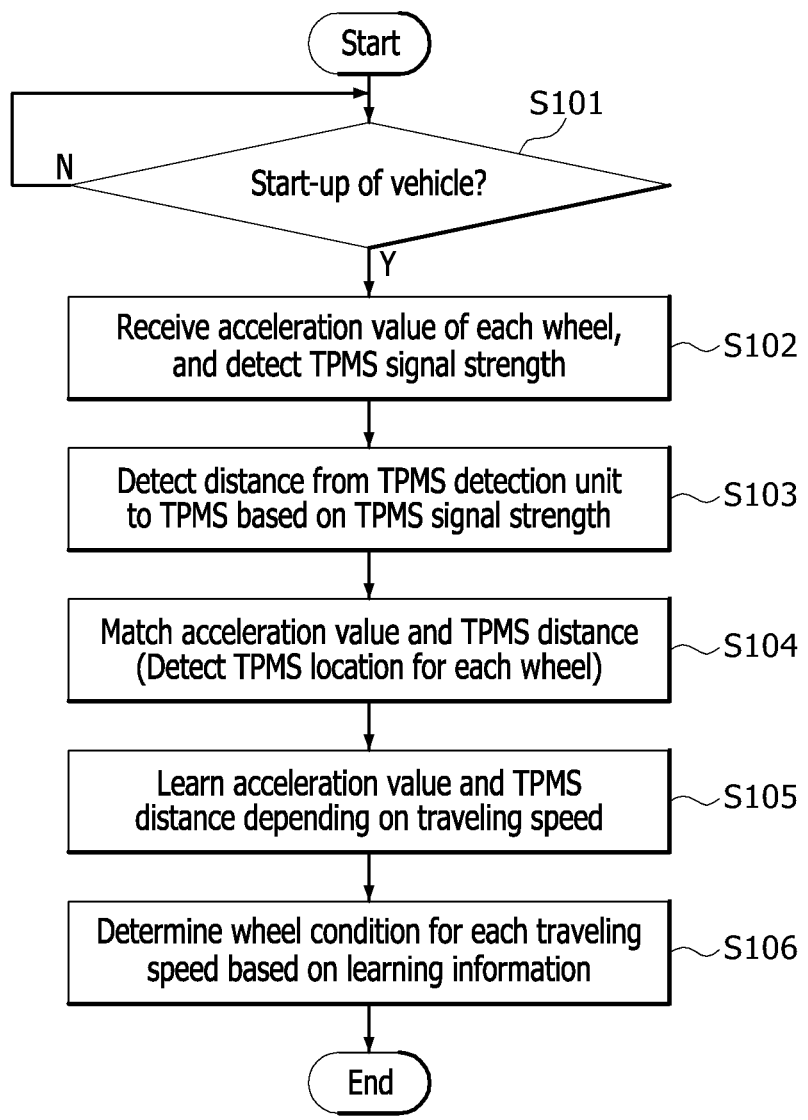
FIG. 4 is a flowchart for describing a method for determining a wheel condition in accordance with an embodiment.

FIG. 4 is a flowchart for describing a method for determining a wheel condition in accordance with an embodiment.

Referring to FIG. 4, the control unit 140 detects a start-up of the vehicle in step S101. When the start-up of the vehicle is detected (Yes in step S101), the control unit 140 receives the acceleration values of the wheels from the respective TPMSs 111 to 114, and detects the strengths of signals transmitted by the TPMSs 111 to 114, the signals including designated information (for example, pressure values and acceleration values), in step 102.

The control unit 140 calculates or detects distances from the TPMS detection units 121 to 124 to the TPMSs 111 to 114 based on the strengths of the signals, in step S103.

The control unit 140 detects or calculates the locations of the TPMSs within the respective wheels by matching the acceleration values with the distances from the TPMS detection units 121 to 124 to the TPMSs 111 to 114, in step S104.

At this time, since the locations of the TPMSs 111 to 114 in the respective wheels are different from one another, a change in location depending on the rotation of each of the wheels is managed in real time. That is, the control unit 140 learns the acceleration values and the distances from the TPMS detection units 121 to 124 to the TPMSs 111 to 114 depending on the traveling speed, in step S105.

As the learning process is performed as described above, the control unit 140 determines the conditions (for example, wheel locking) of the wheels according to the acceleration values and the distances from the TPMS detection units 121 to 124 to the TPMSs 111 to 114 for each traveling speed, based on the learning information, in step S106.

In some embodiments, when the WSS fails, a wheel condition that indicates whether wheel locking occurs in each wheel is determined using information detected via the WSS, and when the WSS fails, the wheel condition is determined using information detected by the TPMS. By way of example, the WSS may be configured to output a failure signal indicating a failure of the WSS, in which the control unit is configured to use information detected via the TPMS for determining the wheel condition for each wheel of the vehicle upon receiving the failure signal. Continuing with this example, the WSS may be configured to output an operational signal indicating a normal operative condition of the WSS, in which the control unit is configured to use information detected via the WSS for determining the wheel condition for each wheel of the vehicle upon receiving the operational signal. In an alternative implementation, a failure condition of a WSS provided on a wheel of a vehicle may be determined by the control unit of the vehicle receiving WSS-sensed signals from the WSS for at least a preset time period, such as twice or three times a 'normal time period' for when WSS-sensed signals are normally received by the control unit (e.g., every ½ second, every second, etc.) when such signals are periodically output by the WSS when it is operating normally.

In accordance with the embodiments described herein, the apparatus and method may doubly determine the conditions of the wheels by using two types of sensors (for example, the WSSs and the TPMSs) or determine the conditions of the wheels through the dualization of the sensors, and control the braking unit (i.e. at least one of the first and second braking units 151 and 152) based on the wheel conditions determined through the TPMSs as well as the wheel conditions determined through the existing WSSs, thereby improving the braking stability of an autonomous vehicle.

Although the present disclosure has been described with reference to the embodiments illustrated in the drawings, the embodiments are only for illustrative purposes, and those skilled in the art to which the present technology pertains will appreciate that various modifications and other equivalent embodiments are possible therefrom. Thus, the true technical scope of the present disclosure should be defined by the following claims. Furthermore, the embodiments described in this specification may be implemented with a method or process, an apparatus, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. Examples of the processor include a communication device, such as a computer, a cell phone, a PDA (Personal Digital Assistant) and another device, which can facilitate information communication between end users.

Although exemplary embodiments have been disclosed for illustrative purposes, those skilled in the art will appreciate that various modifications, additions and substitutions are possible, without departing from the scope of the disclosure as defined in the accompanying claims. Thus, the true technical scope of the disclosure should be defined by the following claims.

What is claimed is:

1. An apparatus for determining a wheel condition on whether wheel locking occurs in each wheel of a vehicle, the apparatus comprising:
    a Wheel Speed Sensor (WSS) configured to primarily detect whether wheel locking occurs;
    a Tire Pressure Monitoring System (TPMS) mounted within each wheel of the vehicle and that is configured to secondarily detect whether wheel locking occurs; and
    a control unit including at least a processor and that is configured to determine, when the WSS fails, a wheel condition that indicates whether wheel locking occurs in each wheel, by using information detected via the TPMS,
    wherein the control unit controls at least one of a main brake apparatus and an auxiliary brake apparatus by determining the wheel condition for each wheel.

2. The apparatus of claim 1, wherein the control unit determines the wheel condition on whether wheel locking occurs in each wheel, by using acceleration information detected via the TPMS or an acceleration sensor.

3. The apparatus of claim 1, further comprising a TPMS detection unit mounted at each wheel of the vehicle and that is configured to detect a strength of a sensing value signal received from the TPMS, wherein, whenever the vehicle is operated, the control unit calculates and learns a distance from the TPMS detection unit to the TPMS, a rotation angle and rotation speed of corresponding wheel, and a location of the TPMS within the corresponding wheel, and determines a wheel condition for a traveling speed of the vehicle, based on the calculated and learned information.

4. The apparatus of claim 3, wherein the sensing value signal received from the TPMS comprises information of change periods of an acceleration value and a pressure value of the corresponding wheel.

5. The apparatus of claim 4, wherein the control unit calculates the rotation angle and rotation speed of the corresponding wheel based on the change periods of the pressure value and the acceleration value of the corresponding wheel detected by the TPMS.

6. The apparatus of claim 3, wherein the strength of the sensing value signal received from the TPMS is increased as the distance between the TPMS and the TPMS detection unit decreases while the corresponding wheel is rotated, and is decreased as the distance between the TPMS and the TPMS detection unit increases while the corresponding wheel is rotated.

7. The apparatus of claim 3, wherein the TPMS detection unit transmits, to the control unit via a communication unit, the strength of the sensing value signal and the calculated and learned information.

8. The apparatus of claim 7, wherein the control unit outputs the calculated and learned information of the corresponding wheel to a display device installed in a designated output unit through the communication unit, by using a Graphic User Interface (GUI).

9. The apparatus of claim 3, wherein the control unit calculates the distance from the TPMS detection unit to the TPMS based on the strength of the sensing value signal.

10. The apparatus of claim 3, wherein the control unit calculates the location of the TPMS within the corresponding wheel, based on the distance from the TPMS detection unit to the TPMS and the rotation angle and rotation speed of the corresponding wheel.

11. The apparatus of claim 3, wherein the control unit controls at least one of the main brake apparatus and the auxiliary brake apparatus based on the distance from the TPMS detection unit to the TPMS, the rotation angle and rotation speed of the corresponding wheel, and the location of the TPMS within the corresponding wheel.

12. The apparatus of claim 1, wherein the WSS is configured to output a failure signal indicating the failure of the WSS, and wherein the control unit is configured to use information detected via the TPMS for determining the wheel condition for each wheel of the vehicle upon receiving the failure signal.

13. The apparatus of claim 12, wherein the WSS is configured to output an operational signal indicating a normal operative condition of the WSS, and wherein the control unit is configured to use the information detected via the WSS for determining the wheel condition for each wheel of the vehicle upon receiving the operational signal.

* * * * *